United States Patent
Decusatis et al.

(10) Patent No.: US 9,632,815 B2
(45) Date of Patent: *Apr. 25, 2017

(54) MANAGING VIRTUAL MACHINES ACCORDING TO NETWORK BANDWIDTH

(71) Applicant: International Business Machines Corporation, Armonk, NY (US)

(72) Inventors: Casimer M. Decusatis, Poughkeepsie, NY (US); Edward S. Suffern, Chapel Hill, NC (US); Laura A. Weaver, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,353

(22) Filed: Feb. 17, 2016

(65) Prior Publication Data

US 2016/0170793 A1    Jun. 16, 2016

Related U.S. Application Data

(63) Continuation of application No. 14/570,185, filed on Dec. 15, 2014.

(51) Int. Cl.
*G06F 9/46* (2006.01)
*G06F 9/455* (2006.01)
(Continued)

(52) U.S. Cl.
CPC ........ *G06F 9/45558* (2013.01); *G06F 9/5077* (2013.01); *H04L 41/0896* (2013.01);
(Continued)

(58) Field of Classification Search
None
See application file for complete search history.

(56) References Cited

U.S. PATENT DOCUMENTS 7,962,587 B2    6/2011   Tripathi
8,060,875 B1 *  11/2011  Lambeth ............... G06F 9/5077
                                                        709/223

(Continued)

FOREIGN PATENT DOCUMENTS

EP    2335162 B1    11/2013

OTHER PUBLICATIONS

P. Mell et al., "The NIST Definition of Cloud Computing", National Institute of Standards and Technology, Information Technology Laboratory, Version 15, Oct. 7, 2009, pp. 1-2.

(Continued)

*Primary Examiner* — Abdullah Al Kawsar
*Assistant Examiner* — Bradley Teets
(74) *Attorney, Agent, or Firm* — Law Office of Jim Boice

(57) ABSTRACT

A processor-implemented method manages virtual machines that execute on physical servers in a server cloud. One or more processors establish a maximum network bandwidth percentage for a physical server in the server cloud. The maximum network bandwidth percentage is a percentage of a total network bandwidth capability designed for the first physical server. Response time for operational requests to one or more virtual machines on the first physical server changes beyond a predefined differential in response to the maximum network bandwidth percentage being reached. In response to the NIC controller device on the first physical server determining that the maximum network bandwidth percentage for the first physical server is exceeded, a cloud service hypervisor device moves one or more virtual machines on the first physical server to a second physical server in the server cloud.

6 Claims, 9 Drawing Sheets

(51) Int. Cl.
*H04L 12/24* (2006.01)
*G06F 9/50* (2006.01)
*H04L 29/08* (2006.01)
*H04L 12/26* (2006.01)
*H04L 12/911* (2013.01)

(52) U.S. Cl.
CPC .......... *H04L 43/0817* (2013.01); *H04L 67/10* (2013.01); *G06F 2009/4557* (2013.01); *G06F 2009/45595* (2013.01); *H04L 41/5096* (2013.01); *H04L 43/16* (2013.01); *H04L 47/821* (2013.01)

(56) References Cited

U.S. PATENT DOCUMENTS

| | | | |
|---|---|---|---|
| 8,352,953 B2 | 1/2013 | Bozek et al. | |
| 8,635,493 B2 | 1/2014 | Ziskind et al. | |
| 8,667,500 B1 | 3/2014 | Ji et al. | |
| 8,914,511 B1* | 12/2014 | Yemini | G06Q 10/06 705/7.35 |
| 2002/0110084 A1* | 8/2002 | Butt | H04L 47/10 370/230 |
| 2005/0033596 A1* | 2/2005 | Tummolo | G06Q 30/02 705/1.1 |
| 2009/0158275 A1* | 6/2009 | Wang | G06F 9/5077 718/1 |
| 2010/0027420 A1* | 2/2010 | Smith | G06F 9/4856 370/235 |
| 2011/0258324 A1* | 10/2011 | Woundy | H04L 41/0893 709/226 |
| 2012/0180040 A1* | 7/2012 | DeLuca | G06F 17/30867 718/1 |
| 2013/0111492 A1* | 5/2013 | Nojiri | G06F 1/206 718/104 |
| 2014/0068608 A1* | 3/2014 | Kulkarni | G06F 9/45558 718/1 |
| 2014/0165063 A1* | 6/2014 | Shiva | G06F 21/57 718/1 |
| 2015/0154046 A1* | 6/2015 | Farkas | G06F 9/485 718/1 |
| 2016/0170787 A1* | 6/2016 | DeCusatis | G06F 9/45558 718/1 |

OTHER PUBLICATIONS

Anonymous, "12.5. Setting Migration Priority", Red Hat, Inc., access.redhat.com, retrieved Aug. 13, 2014, 1 page.
Anonymous, "Scheduling (Computing)", Wikimedia Foundation, Inc., wikipedia.org, retrieved Aug. 13, 2014, last modified Aug. 13, 2014, pp. 1-13.
D. Kim et al., "Guest-Aware Priority-Based Virtual Machine Scheduling for Highly Consolidated Server", Springer-Verlag, Euro-Par 2008, LNCS 5168, 2008, pp. 285-294.
N. Gunther, "Bandwidth vs. Latency—The World is Curved", The Pith of Performance blog, perfdynamics.blogspot.com, Mar. 21, 2010, pp. 1-5.
List of IBM Patents or Patent Applications Treated as Related, Oct. 18, 2016, pp. 1-2.

* cited by examiner

MANAGING VIRTUAL MACHINES ACCORDING TO NETWORK BANDWIDTH

BACKGROUND

The present disclosure relates to the field of virtual machines, and specifically to the field of virtual machines running on physical computers in a server cloud. Still more specifically, the present disclosure relates to configuring and deploying virtual machines on physical computers in a server cloud.

SUMMARY

In an embodiment of the present invention, a processor-implemented method manages virtual machines that execute on physical servers in a server cloud. One or more processors establish a maximum network bandwidth percentage for a physical server in the server cloud. The maximum network bandwidth percentage is a percentage of a total network bandwidth capability designed for the first physical server. Response time for operational requests to one or more virtual machines on the first physical server changes beyond a predefined differential in response to the maximum network bandwidth percentage being reached. A network interface card (NIC) controller device on the first physical server determines that the maximum network bandwidth percentage for the first physical server is exceeded. In response to the NIC controller device on the first physical server determining that the maximum network bandwidth percentage for the first physical server is exceeded, a cloud service hypervisor device moves one or more virtual machines on the first physical server to a second physical server in the server cloud.

DETAILED DESCRIPTION

Figure 1:
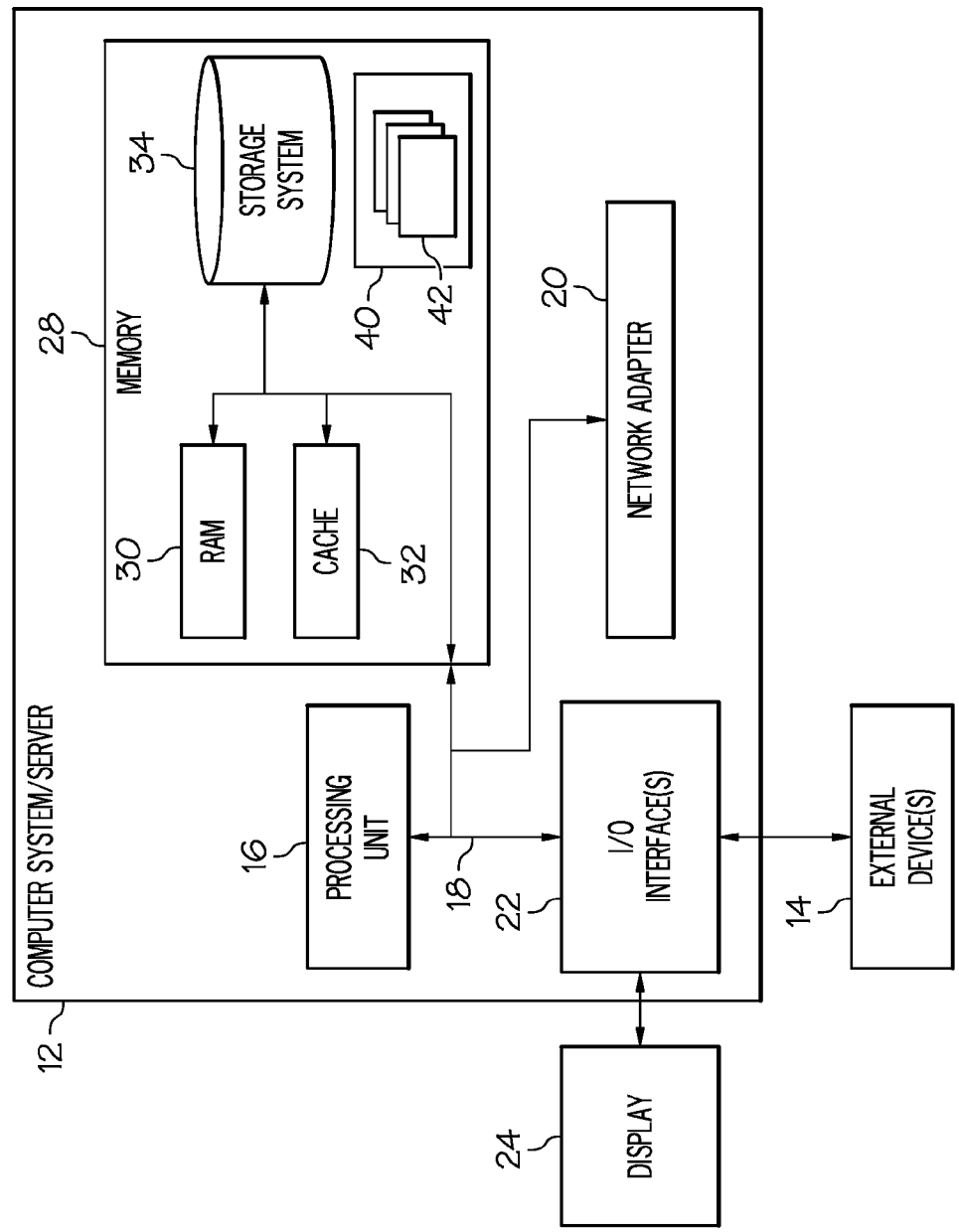
FIG. 1 depicts a cloud computing node according to an embodiment of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that in one or more embodiments, the present invention is capable of being implemented in a cloud computing environment.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, network bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In one or more embodiments of the present invention, external devices 14 utilize the architecture of the computer system/server 12 shown in FIG. 1. Similarly, some or all of the architecture of computer system/server 10 can be implemented in the physical servers 402a-402b and/or the client computer 404 shown in FIG. 4.

Figure 2:
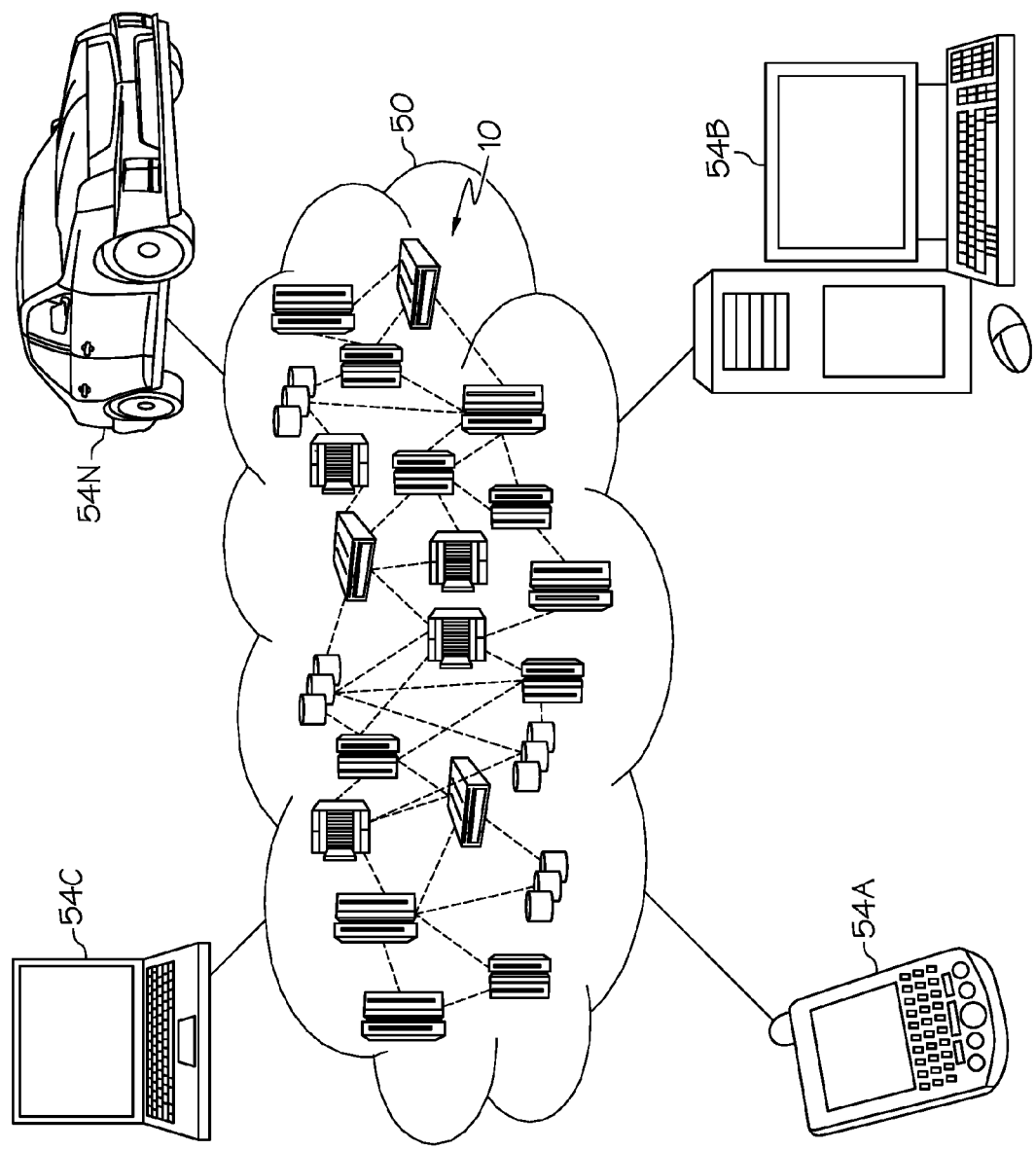
FIG. 2 illustrates a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
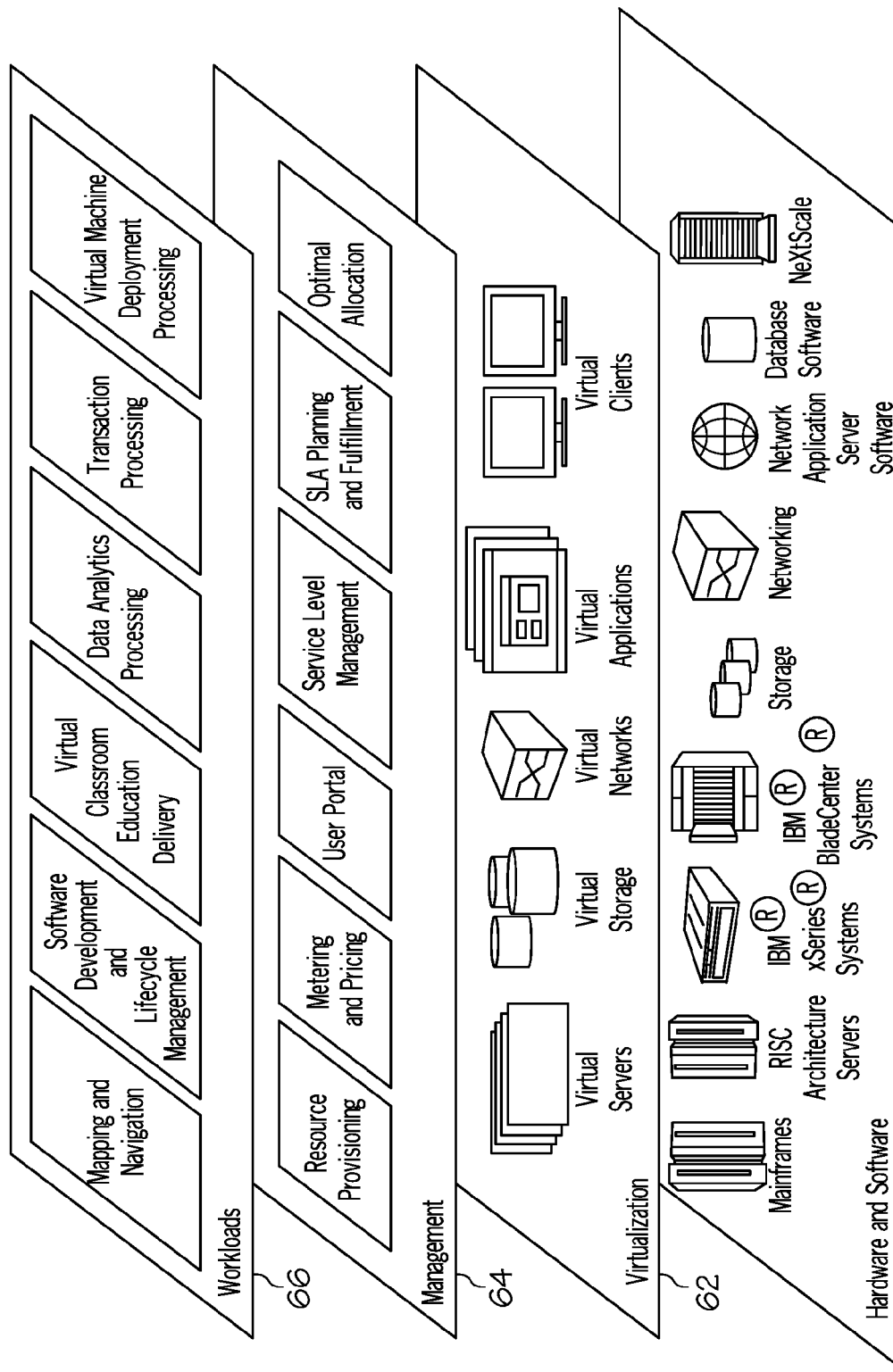
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; NeXtScale; storage devices; networks and networking components. Examples of software components include network application server software, in one example IBM WebSphere® application server software; and database software, in one example IBM DB2® database software. (IBM, zSeries, pSeries, xSeries, BladeCenter, NeXtScale, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing virtual machines, as described herein, and as represented by the "Virtual Machine Deployment Processing" found in workloads layer 66.

Figure 4:
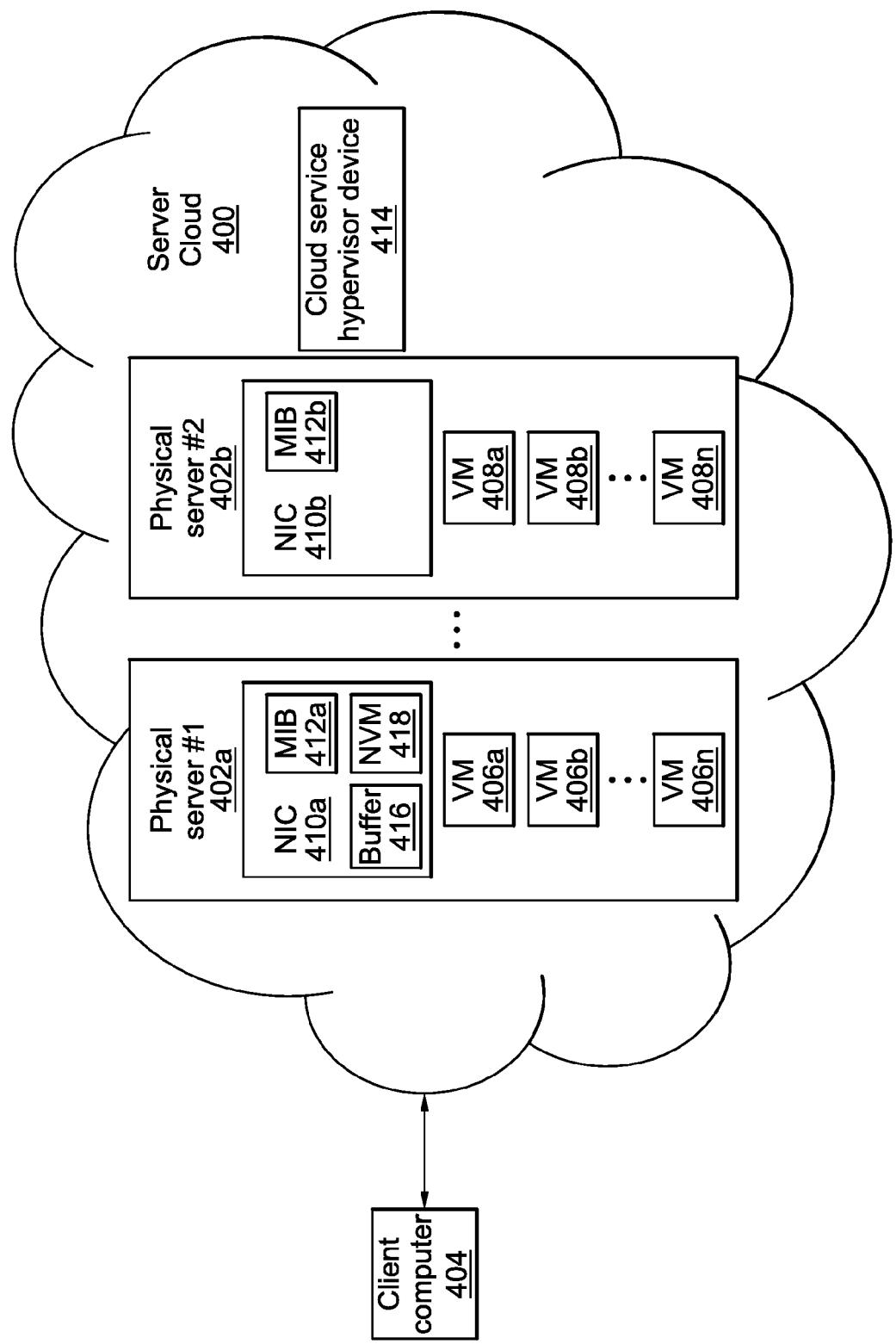
FIG. 4 illustrates an exemplary server cloud in which one or more embodiments of the present invention may be incorporated.

With reference now to FIG. 4, an exemplary server cloud 400 in which one or more embodiments of the present invention may be incorporated is presented. As shown, server cloud 400 is made up of multiple physical servers 402a-402b (where "b" is an integer). Depicted are two of the physical servers 402a-402b, which are referred to herein as server #1 and server #2. In one or more embodiments of the present invention, one or more of the physical servers 402a-402b are communicably connected (i.e., are able to exchange messages, instructions, data, virtual machines, etc.).

A client computer 404 is able to utilize the resources within the server cloud 400. In one or more embodiments of the present invention, the resources used by the client computer 404 are virtual machines. A virtual machine is an emulation of a real computer. That is, a virtual machine responds to inputs, instructions, signals, etc. just like a real computer would, but such inputs, instructions, signals, etc. are manipulated by software within a physical computer that may or may not be the same type of computer being emulated. The physical computer (often a server) is able to emulate multiple computers (known as virtual machines, or "VMs").

Thus, the physical computers (e.g., server #1 (402a) and server #2 (402b)) within the server cloud 400 are able to emulate multiple computers, shown as virtual machines 406a-406n (where "n" is an integer) in server #1, and as virtual machines 408a-408n (where "n" is an integer) in server #2.

Traffic to and from the virtual machines are via a network interface card (NIC) hardware device. A network interface card, also known as a network interface controller, network adapter, local area network (LAN) adapter, etc., is a computer hardware device the connects a computer to a computer network. As depicted in FIG. 4, server #1 uses NIC 410a, while server #2 uses NIC 410b to connect to other servers within the server cloud 400 and to devices outside of the server cloud 400, such as client computer 404.

Each NIC utilizes a management information base (MIB). An MIB is a database used to manage resources in a cloud or other network of resources. Information in the MIB is specific for managed resources in the cloud. The MIB contains object instances, which are identified by object identifiers (OIDs), which describe characteristics of the managed resources, such as their identity, their type (e.g., a server, a storage device, an application, etc.), etc., as well as current states (e.g., turned on or off, register values within the resource, workload queue levels, etc.). Thus, NIC 402a in server #1 uses MIB 412a, while NIC 402b in server #2 uses MIB 412b.

The MIBs (e.g., MIB 412a and MIB 412b) are used by a cloud service hypervisor device 414 to manage resources in the server cloud 400, both by receiving information from the resources in the form of SNMP traps (which are received by a trap receiver within the cloud service hypervisor device 414), and by transmitting instructions from the cloud service hypervisor device 414 to the physical servers 402a-402b within the server cloud 400 (in the form of a GET/SET request). In one or more embodiments, the cloud service hypervisor device 414 is a hardware device that is constructed to solely perform the function of directing messages to the servers 402a-402b (e.g., as a router).

The NICs 410a-410b and/or the cloud service hypervisor device 414 are thus able to monitor what percentage of available network bandwidth is being used by each of the servers 402a-402b. This information can then be graphed by one or more processors, which take readings directly from the NICs 410a-410b and/or the cloud service hypervisor device 414, along with known maximum network bandwidth capabilities for each of the servers 402a-402b.

Figure 5A:
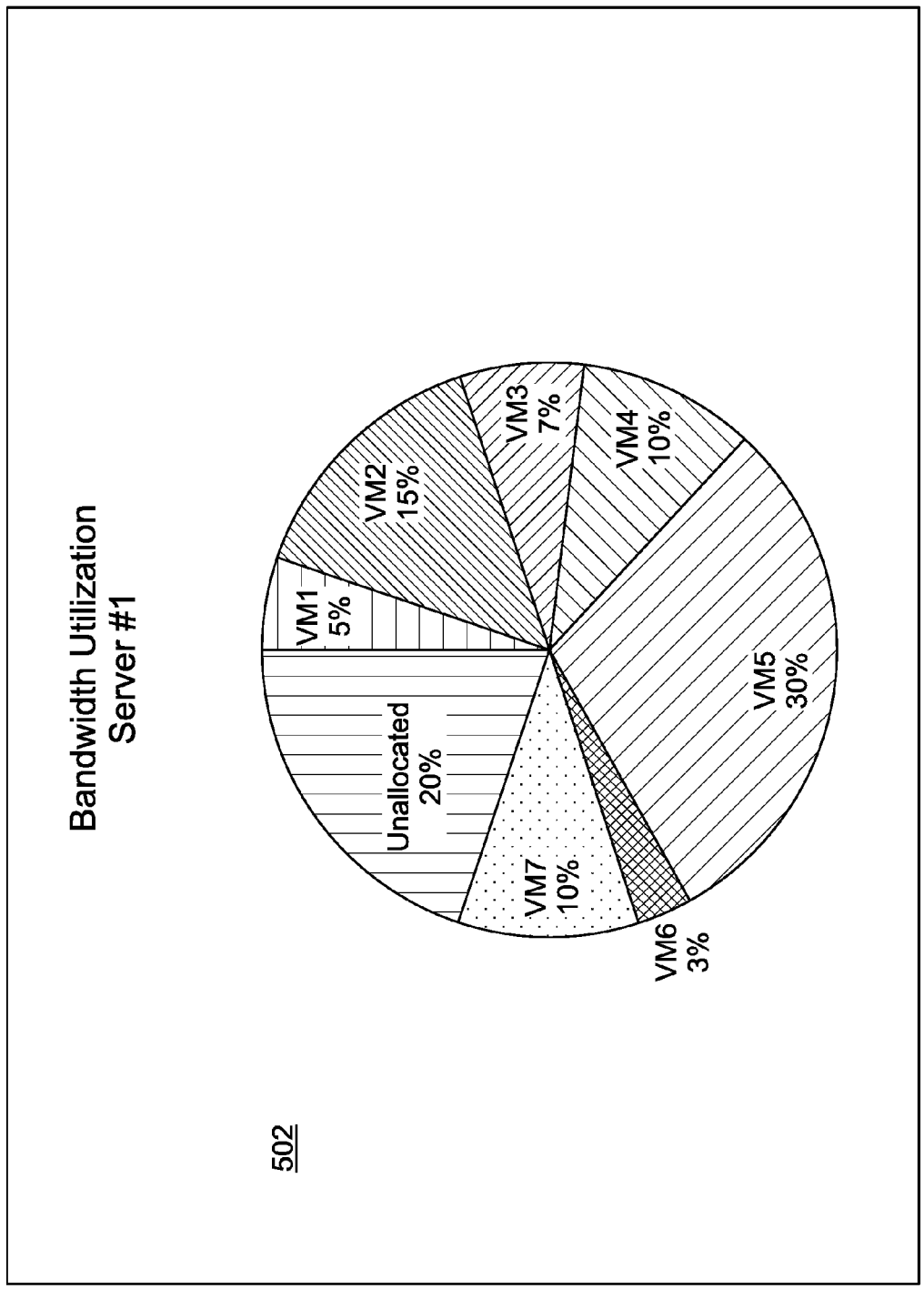
FIGS. 5A-5B depicts network bandwidth utilization percentages of two servers depicted in FIG. 4.
Figure 5B:
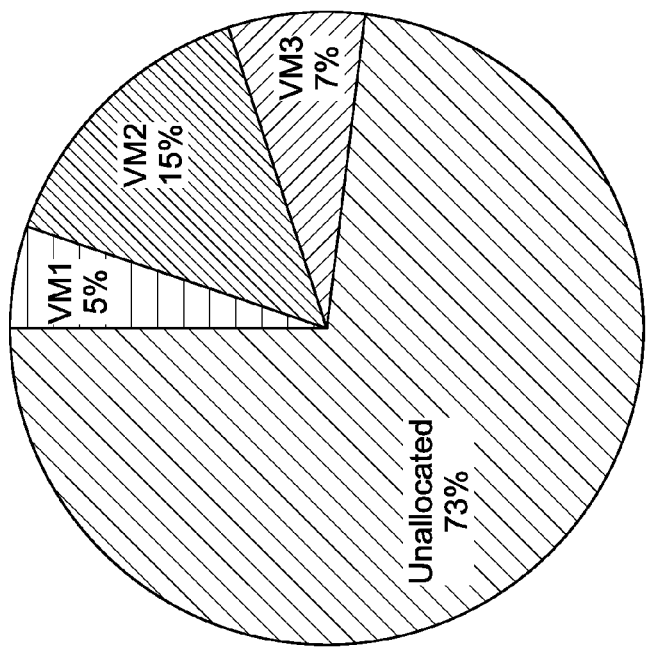

For example, consider graph 502 and graph 504 in FIGS. 5A-5B, which respectively depict network bandwidth utilization percentages of the server #1 (server 402a) and the server #2 (server 402b) depicted in FIG. 4. That is, each server and/or its NIC is designed to be able to exchange a certain rate of data (typically in megabits per second) to and from a network, such as a network that interconnects the servers 402a-402b to one another, and/or to other devices such as client computer 404 and cloud service hypervisor device 414 in FIG. 4. As shown in graph 504, only 27% of the available (i.e., designed) network bandwidth is currently being used by server #2. However, as shown in graph 502, 80% of the available network bandwidth is currently being used by server #1.

Figure 6:
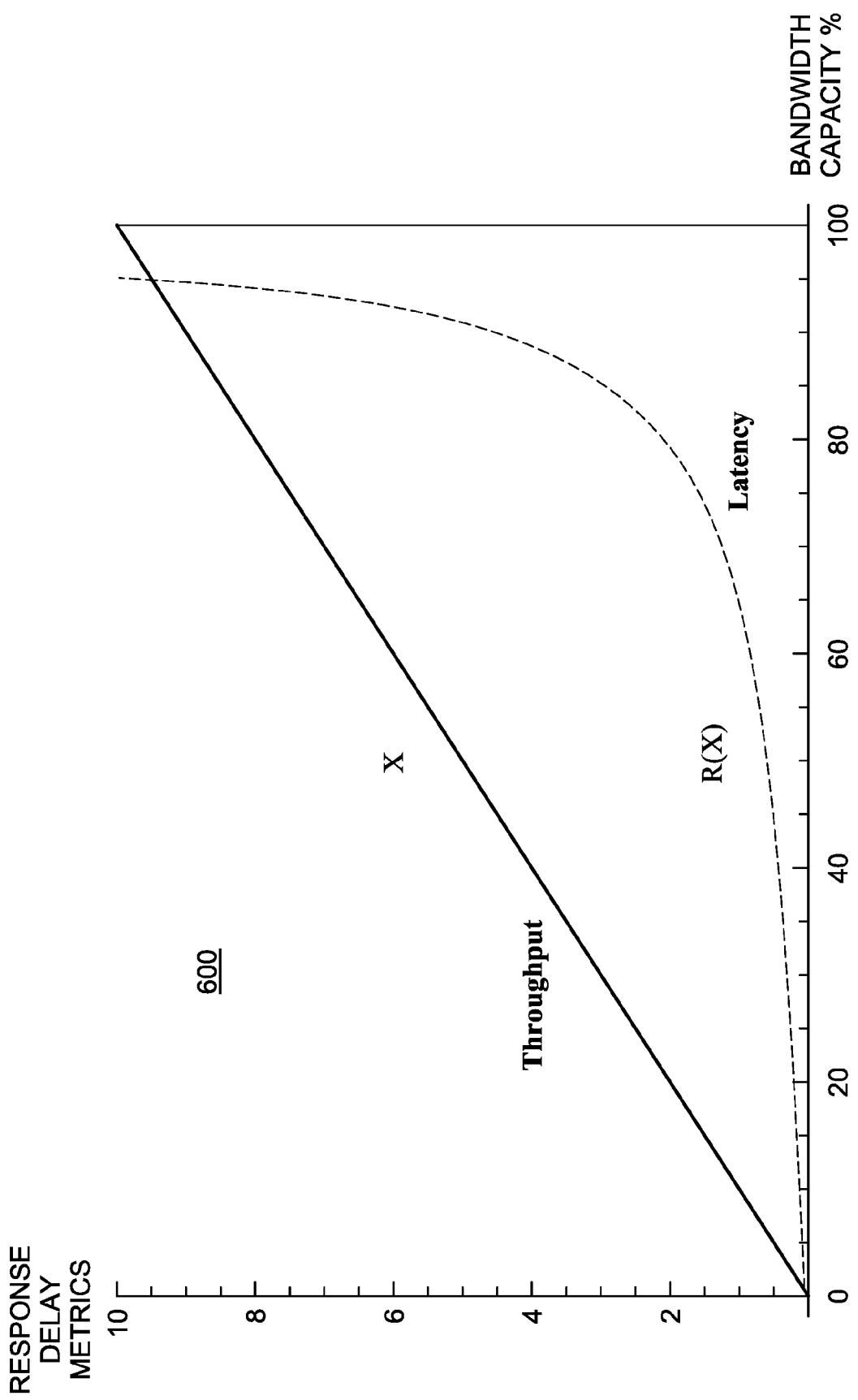
FIG. 6 illustrates response delays in a physical server according to a percentage of network bandwidth being utilized.

As shown in FIG. 6, if servers such as server #1 and/or server #2 use more than 70% of their nominal (available/designed) network bandwidth, then delays in handling work increase dramatically (e.g., asymptotically). That is, even if server #1 has plenty of capacity in its memory, processors, etc., there still is a degradation in the performance of server #1 in responding to work orders if more than 70% of its nominal network bandwidth is being used.

Many issues can contribute to the degradation in response times to work orders and other requests of resources (e.g., virtual machines) if network bandwidth is exceeded for a particular server. For example, the NIC may simply be overloaded, thus creating a bottleneck in the pathway between a requester (e.g., client computer 404 in FIG. 4) and a server (e.g., server #1 (402a) in FIG. 4). In this embodiment, readings from a NIC (e.g., NIC 410a in FIG. 4) are taken directly by the cloud service hypervisor device 414, which then reallocates the placement of active VMs to another server (e.g., server #2). Thus, all functions are performed using hardware components of the server cloud 400, thereby improving the performance of the server cloud 400 without any human intervention.

Another factor that can affect the response time if the network bandwidth is overtaxed is overworked input/output buffers. In one or more embodiments of the present invention, network traffic sent to NIC 410a is initially stored in a buffer 416. If buffer 416 is full, then the data/traffic/messages are either returned to the client computer 404 with an error message, or they are stored in a slower non-volatile memory (NVM) 418 within the NIC 410a. Either scenario results in a degradation in response times to the messages/requests from the client computer 404. In this embodiment, error messages are sent directly from NIC 410a to the cloud service hypervisor device 414, which then reallocates the placement of active VMs to another server (e.g., server #2). Thus, all functions are performed using hardware components of the server cloud 400, thereby improving the performance of the server cloud 400 without any human intervention.

Regardless of what causes the degradation in response times, historical data may indicate that degradations occur at the trigger point (e.g., usage of 70% of the designed network bandwidth for the server) for a particular server, as depicted in FIG. 6. In order to alleviate this condition, the network bandwidth demands are reduced by removing one or more VMs from the slowly-responding server (e.g., server #1). For example, consider now the VM movement depicted in FIG. 7.

Figure 7:
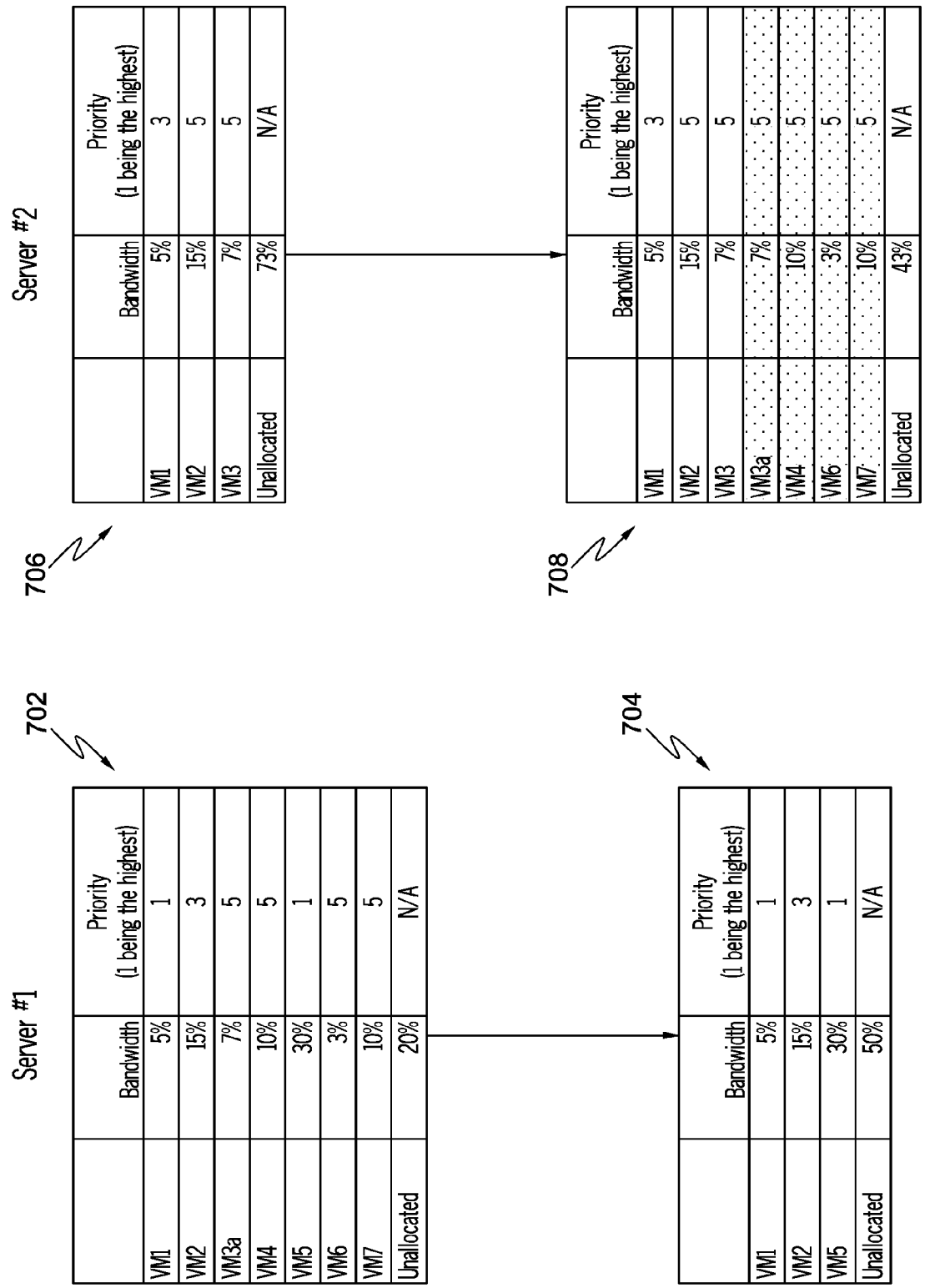
FIG. 7 depicts tables showing a movement of various virtual machines from a first physical server to a second physical server within a server cloud, based on network bandwidth percentage utilization by the first physical server.

FIG. 7 depicts tables showing a movement of various virtual machines from a first physical server to a second physical server within a server cloud, based on network bandwidth percentage utilization by the first physical server. As shown in table 702, server #1 initially had only 20% unallocated network bandwidth (as also shown in graph 502 in FIG. 5A). Thus, server #1 was using 80% of its network bandwidth. As discussed in FIG. 6, assume that any network bandwidth usage over 70% leads to a severe increase in response delay times. Thus, the cloud service hypervisor device 414 will remove lower priority VMs from server #1, as depicted in table 704. Initially server #2 has 73% unallocated (i.e., 27% used) network bandwidth. Assuming that server #2's performance is that shown in graph 600 in FIG. 6, then server #2 can handle much more VM load without risking a reduction in response times. As depicted in table 708, the VMs that were removed from server #1 (VM3a, VM4, VM6, and VM7) are now moved to server #2, while still leaving server #2 with 43% unallocated network bandwidth (i.e., only 57% of the nominal network bandwidth of server #2 is being utilized).

Figure 8:
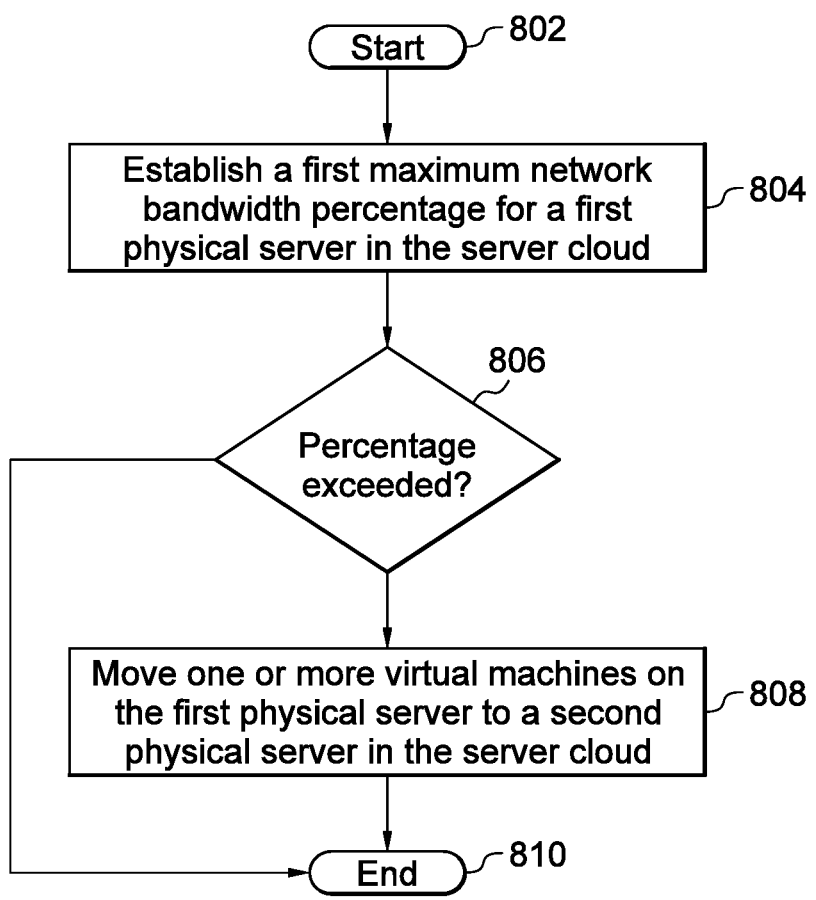
FIG. 8 is a high-level flowchart of one or more steps performed by one or more processors and/or other hardware devices to manage virtual machine deployment to physical servers in a server cloud.

With reference now to FIG. 8, a high-level flowchart of one or more steps performed by one or more processors and/or other hardware to optimize performance of virtual machines in a server cloud is presented. After initiator block 802, one or more processors establish a first maximum network bandwidth percentage for a first physical server in the server cloud (block 804). The maximum network bandwidth percentage is a percentage of a total network bandwidth capability designed for the first physical server. In one or more embodiments, this percentage is determined from readings from a NIC/MIB on the first physical server. The NIC provides a value that describes how much network bandwidth is being used, and the MIB describes the maximum network bandwidth that the first physical server can provide.

As depicted in graph 600 in FIG. 6, response times for operational requests to one or more virtual machines on the first physical server change beyond a predefined differential in response to the first maximum network bandwidth percentage being reached. For example, upon reaching 70%-80% of the designed network traffic capacity for a server, the differential (i.e., rate of change in the response delay times compared with changes in network bandwidth capacity percentages) changes radically (e.g., asymptotically—taking on the mathematical characteristics of a curved line that approaches, but never reaches an asymptote line).

Note that in one or more embodiments of the present invention, the decision to move VMs from one server to another server is not predicated on a system being "overloaded", but rather on the differential change in response times to requests. Thus, a system may be working well below its rated nominal capacity (as is the case in graph 600 in FIG. 6), but there is nonetheless a dramatic shift in the response delay metrics, thus prompting the movement of VMs from the first server to the second server.

Continuing with FIG. 8, a query is made (query block 806) as to whether a network interface card (NIC) controller device on the first physical server has determined that the first maximum network bandwidth percentage for the first physical server is exceeded. The NIC controller device (e.g., NIC 410a in FIG. 4) is able to identify how much network bandwidth (e.g., bits per second of data) is being used by the first physical server (e.g., physical server #1—402a in FIG. 4). Using information from the NIC 412a regarding the maximum network bandwidth that the first server is rated for (e.g., the maximum rate at which the NIC 410a can send/receive data), the NIC 410a (or alternatively another logic, such as the cloud service hypervisor device 414) is able to determine what percentage of the maximum rated network bandwidth is being used by the first physical server.

As described in block 808 of FIG. 8, in response to the NIC controller device on the first physical server determining that the first maximum network bandwidth percentage for the first physical server is exceeded, a cloud service hypervisor device (e.g., the cloud service hypervisor device 414 in FIG. 4) moves one or more virtual machines on the first physical server to a second physical server (e.g., physical server #2—402b in FIG. 4) in the server cloud (e.g., server cloud 400 in FIG. 4).

In an embodiment of the present invention, the first physical server supports a first set of virtual machines and a second set of virtual machines. In the example presented in FIG. 7, server #1 supports two sets of virtual machines (VMs). The first set of VMs has been prioritized over the second set of VMs. That is, VM1, VM2, and VM5 from server #1 make up a first set of VMs having VMs that have been (respectively) prioritized as having 1, 3, 1 priority ratings. A second set of VMs from server #1 is made up of VM3a, VM4, VM6, and VM7, all of which have lower priority ratings of 5. Thus, in order to reallocate VMs between the server #1 and the server #2 in a manner that causes the least amount if disruption, the VMs from the second set of VMs (VM3a, VM4, VM6, and VM7) are migrated to server #2, while VMs from the first set of VMs (VM1, VM2, and VM5) remain in server #1. Moving the VMs (e.g., by the server cloud hypervisor device 414 shown in FIG. 4) causes a network bandwidth percentage for the first physical server to drop below the first maximum network bandwidth percentage.

Various processes can be used by one or more processors to automatically prioritize the VMs, and thus to determine which VMs should be migrated to another server (e.g., server #2—402b in FIG. 4) and which VMs should remain on the first server (e.g., server #1—402a in FIG. 4).

In one embodiment, one or more processors prioritize the first set of virtual machines over the second set of virtual machines according to a length of time that applications have been continuously executing on the virtual machines. For example, assume in FIG. 7 that VM1, VM2, and VM5 have been running for 12 hours straight, while VM3a, VM4, VM6, and VM7 have only been running for the past 1-2 hours. To disrupt VM1, VM2, and VM5 (e.g., by moving them server #2) may cause all of their work to be compromised and/or lost, since the work would have to be paused, states moved, etc. Having this information (length of operation) allows a device (e.g., the cloud service hypervisor device 414) to intelligently decide which VMs should be migrated.

In one embodiment, one or more processors prioritize the first set of virtual machines over the second set of virtual machines according to a dependency on the virtual machines by other virtual machines. For example, assume in FIG. 7 that VM1, VM2, and VM5 are being used by other VMs (not shown) and/or other servers. To move them to another server would require that all interaction between VM1, VM2, and VM5 and the other VMs be suspended while VM1, VM2, and VM5 are migrated to server #2. This movement would also require that a notification be sent to the other VMs, informing the other VMs of the address/location of VM1, VM2, and VM5, an update on any new protocols that the move required, etc. Having this information (number of dependent VMs/servers) allows a device (e.g., the cloud service hypervisor device 414) to intelligently decide which VMs should be migrated.

In one embodiment of the present invention, one or more processors predict future demands on the first physical server based on a quantity of virtual machines in the first set of virtual machines that have been prioritized over the second set of virtual machines. For example, assume that cloud service hypervisor device 414 recognizes that there are 7 VMs running on server #1 (see FIG. 7). Cloud service hypervisor device 414 also recognizes that there are only 3 VMs running on server #2. Cloud service hypervisor device 414 takes this information to predict that server #1 will be selected over server #2 for supporting future VMs. That is, server #1 may be cheaper to lease space from than server #2, server #1 may have a better track record for reliability than server #2, server #1 may have better security hardware/software systems installed thereon than server #2, etc. Whatever the reason, server #1 is known to support more VMs historically, and thus a prediction is made that the trend (of server #1 being busier than server #2) will continue. This allows the cloud service hypervisor device 414 to take proactive steps, such as configuring more physical servers that match the capabilities (network bandwidth, instructions execution rate (i.e., "throughput"), power usage, etc.) and components (CPU, memory, NIC, etc.) of server #1 for future usage.

In one embodiment of the present invention, one or more processors predict that the maximum network bandwidth percentage is reached in response to the response time changing asymptotically. For example, as shown in FIG. 6, the response delay time increase in an asymptotic manner (i.e., the curve of the line shown in FIG. 6 is asymptotic curve, such that the distance between the curve for R(X) and the line (asymptote) at the right of the graph 600 approaches zero as the curve for R(X) and the line at the right of the graph 600 tend to infinity). This asymptotic curve provides mathematical evidence of the significant change that occurs after the network bandwidth capacity percentage for a server exceeds 70% or some other predefined (from historical data and/or component analytics) level.

In one embodiment of the present invention, one or more processors sum network bandwidth requirements for all virtual machines executing in the first physical server, and then determine that the first maximum network bandwidth percentage for the first physical server is exceeded based on summed network bandwidth requirements for all virtual machines executing in the first physical server. For example, as shown in FIGS. 5A-5B and/or FIG. 7, the network bandwidth demands of the different VMs on server #1 are summed up, thus providing the total amount of network bandwidth being consumed by the VMs running on server #1. This total demand is then used to determine whether or not the network bandwidth percentage trigger point (discussed herein) has been reached.

As described herein, a system (e.g., that shown in FIG. 4) includes a server cloud (e.g., server cloud 400). The server cloud includes multiple physical servers (e.g., physical servers 402a-402b). The system also includes a network interface card (NIC) controller device (e.g., NIC 410a in FIG. 4) on a first physical server (e.g., server #1—402a in FIG. 4) in the server cloud. As described herein, the NIC controller device establishes a first maximum network bandwidth percentage for the first physical server in the server cloud, where the maximum network bandwidth percentage is a percentage of a total network bandwidth capability designed for the first physical server, and where response time for operational requests to one or more virtual machines on the first physical server changes beyond a predefined differential in response to the first maximum network bandwidth percentage being reached. The NIC controller also determines that the first maximum network bandwidth percentage for the first physical server is exceeded. A cloud service hypervisor device (e.g., cloud service hypervisor device 414), in response to the NIC controller device on the first physical server determining that the first maximum network bandwidth percentage for the first physical server is exceeded, moves one or more virtual machines on the first physical server to a second physical server in the server cloud.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of managing virtual machines that execute on physical servers in a server cloud, the method comprising:
 establishing, by one or more processors, a first maximum network bandwidth percentage for a first physical server in the server cloud, wherein the first maximum network bandwidth percentage is a percentage of a total network bandwidth capability designed for the first physical server, wherein a response time for operational requests to one or more virtual machines on the first physical server changes beyond a predefined differential in response to the first maximum network bandwidth percentage being reached, and wherein the predefined differential is a rate of change in response delay times for the first physical server compared with changes in network bandwidth capacity percentages for the first physical server;
 determining, by the one or more processors, that the predefined differential has been exceeded;
 determining, by a network interface card (NIC) controller device on the first physical server, that the first maximum network bandwidth percentage for the first physical server is exceeded;
 in response to the NIC controller device on the first physical server determining that the first maximum network bandwidth percentage for the first physical server is exceeded and that the predefined differential is exceeded, moving, by a cloud service hypervisor device, one or more virtual machines on the first physical server to a second physical server in the server cloud;
 wherein the first physical server supports a first set of virtual machines and a second set of virtual machines and prioritizes, by the one or more processors, the first set of virtual machines over the second set of virtual machines;
 moving, by the server cloud hypervisor device, the virtual machines from the second set of virtual machines to the second physical server until a network bandwidth percentage for the first physical server drops below the first maximum network bandwidth percentage, wherein virtual machines from the first set of virtual machines remain on the first physical server;
 predicting, by the one or more processors, future demands on the first physical server, being higher than a demand on the second physical server, based on a quantity of virtual machines in the first set of virtual machines; and
 configuring, by the cloud service hypervisor device, multiple physical servers that match network bandwidth, throughput, power usage, and hardware components of the first physical server, wherein the multiple physical servers are configured to support future virtual machines that meet the future demands on the first physical server, and wherein each of the multiple physical servers minors a configuration of the first physical server.

2. The processor-implemented method of claim 1, further comprising:
 prioritizing, by the one or more processors, the first set of virtual machines over the second set of virtual machines according to a length of time that applications have been continuously executing on the virtual machines.

3. The processor-implemented method of claim 1, further comprising:
 prioritizing, by the one or more processors, the first set of virtual machines over the second set of virtual machines according to a dependency on the virtual machines by other virtual machines.

4. The processor-implemented method of claim 1, further comprising:
 determining, by the one or more processors, that the maximum network bandwidth percentage is reached in response to the response time changing asymptotically relative to changes in network bandwidth changes, wherein asymptotic response time changes have mathematical characteristics of a curved line that approaches, but never reaches an asymptote line, wherein response delay times increase in an asymptotic manner such that a distance between an asymptotic curve representing an increase in the asymptotic response time changes approaches but never reaches a line representing the total network bandwidth capability designed for the first physical server.

5. The processor-implemented method of claim 1, further comprising:

summing, by the one or more processors, network bandwidth requirements for all virtual machines executing in the first physical server; and determining, by the one or more processors, that the first maximum network bandwidth percentage for the first physical server is exceeded based on summed network bandwidth requirements for all virtual machines executing in the first physical server.

6. The processor-implemented method of claim 1, further comprising:

determining, by the cloud service hypervisor device, that input/output buffers on the first physical server are full, wherein the input/output buffers initially store network traffic to the first physical server; and determining, by the cloud service hypervisor device, that the first maximum network bandwidth percentage for the first physical server is exceeded based on the input/output buffers being full.

* * * * *